(12) United States Patent
Parchami et al.

(10) Patent No.: US 10,345,822 B1
(45) Date of Patent: Jul. 9, 2019

(54) COGNITIVE MAPPING FOR VEHICLES

(71) Applicant: Ford Global Technologies, LLC, Dearborn, MI (US)

(72) Inventors: Mostafa Parchami, Dearborn, MI (US); Vahid Taimouri, Santa Clara, CA (US); Gintaras Vincent Puskorius, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/881,228

(22) Filed: Jan. 26, 2018

(51) Int. Cl.
| | |
|---|---|
| *G05D 1/00* | (2006.01) |
| *B60W 30/00* | (2006.01) |
| *G06K 9/00* | (2006.01) |
| *G05D 1/02* | (2006.01) |
| *B60W 30/09* | (2012.01) |

(52) U.S. Cl.
CPC ........... *G05D 1/0251* (2013.01); *B60W 30/09* (2013.01); *G05D 1/0088* (2013.01); *G05D 1/0248* (2013.01); *G06K 9/00791* (2013.01)

(58) Field of Classification Search
CPC .. G05D 1/0251; G05D 1/0088; G05D 1/0248; B60W 30/09; G06K 9/00791
USPC .......................................................... 701/28
See application file for complete search history.

(56) References Cited

U.S. PATENT DOCUMENTS

| | | | |
|---|---|---|---|
| 10,067,509 B1* | 9/2018 | Wang | G05D 1/0231 |
| 2016/0094808 A1* | 3/2016 | Cerri | B60R 1/00 348/36 |
| 2016/0210525 A1* | 7/2016 | Yang | G06K 9/0063 |
| 2017/0186176 A1* | 6/2017 | Paluri | G06T 7/204 |
| 2017/0236305 A1* | 8/2017 | Staudenmaier | G06T 7/80 348/148 |
| 2018/0284265 A1* | 10/2018 | Bilik | B60W 30/08 |
| 2019/0012548 A1 | 1/2019 | Levi et al. | |

FOREIGN PATENT DOCUMENTS

| | | |
|---|---|---|
| CN | 105488534 A | 4/2016 |
| CN | 106125730 A | 11/2016 |
| CN | 106372577 A | 2/2017 |
| CN | 106558058 A | 4/2017 |
| CN | 107169421 A | 9/2017 |
| EP | 3171292 A1 | 5/2017 |

OTHER PUBLICATIONS

Haque et al. article entitled "Joint Semantic and Motion Segmentation for dynamic scenes using Deep Convolutional Networks," arXiv:1704.08331v1 [cs.CV] 18.

* cited by examiner

*Primary Examiner* — Marthe Y Marc-Coleman
(74) *Attorney, Agent, or Firm* — Frank A. MacKenzie; Bejin Bieneman PLC

(57) ABSTRACT

A system, comprising a processor, and a memory, the memory including instructions to be executed by the processor to acquire the images of the vehicle environment, determine a cognitive map, which includes a top-down view of the vehicle environment, based on the image, and operate the vehicle based on the cognitive map.

18 Claims, 6 Drawing Sheets

COGNITIVE MAPPING FOR VEHICLES

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon determining predicted vehicle trajectories based on accurate and timely information regarding the vehicle's environment. For example, safe and comfortable operation of the vehicle can depend upon acquiring accurate and timely information regarding objects in a vehicle's environment while the vehicle is being operated on a roadway. It is a problem to provide accurate and timely information regarding objects near or around a vehicle to support operation of the vehicle.

DETAILED DESCRIPTION

Figure 1:
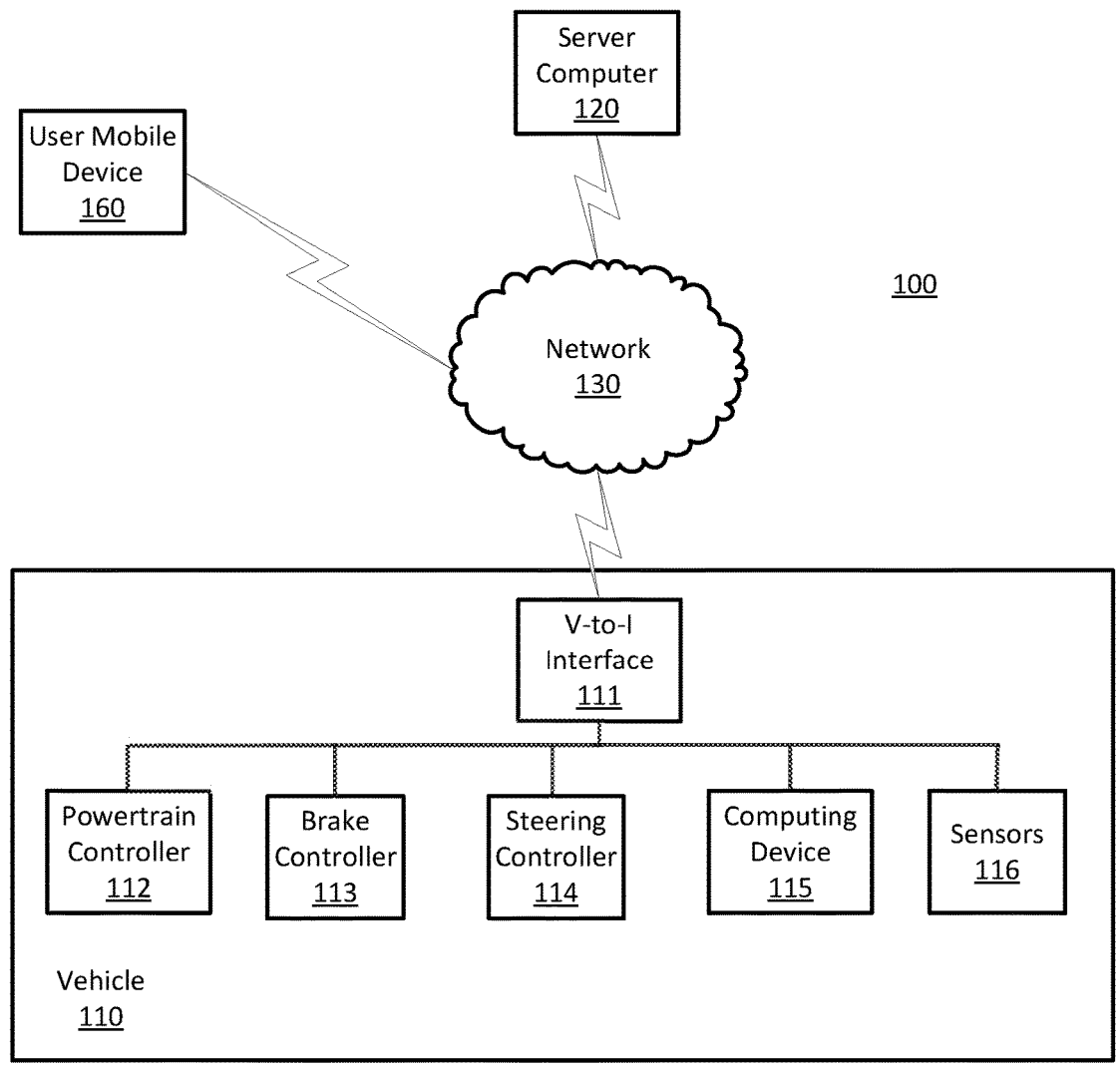
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

An estimate of a location, e.g., according to geo-coordinates, of a vehicle with respect to a map can be used by a computing device to operate a vehicle on a roadway from a current location to a determined destination, for example. The map can be a cognitive map. A cognitive map in the context of this disclosure is a top-down view, 2D representation of the physical environment around a vehicle. In examples where a vehicle is in motion, for example, operating on a roadway, the cognitive map can include a top-down, 2D representation of the roadway ahead of a current vehicle location and in a direction of current vehicle travel. The direction of current vehicle travel is based on the current vehicle trajectory, which includes speed, direction, longitudinal acceleration, and lateral acceleration. The cognitive map can include a roadway and objects such as lanes, barriers, shoulders, and lane markers, vehicles and pedestrians, for example.

In the field of psychology, a cognitive map is a mental representation of the physical environment. For example, humans and animals use cognitive maps to find their way around their environment. In the present disclosure, a cognitive map is used by a computing device to operate a vehicle, including actuating vehicle components including powertrain, steering and braking to direct the vehicle from a current location to a destination location in a safe and comfortable fashion. The cognitive map can be used by the computing device to determine predicted vehicle trajectories based on determined locations of lanes and determined locations and trajectories of other vehicles in the cognitive map, for example. A cognitive map can depict semantic segmentation of objects viewed from top-down view and accurately illustrate a distance to each point from vehicle 110.

Disclosed herein is a method, including acquiring an image of a vehicle environment, determining a cognitive map, which includes a top-down view of the vehicle environment, based on the image, and operating the vehicle based on the cognitive map. The vehicle environment can include a roadway and objects including other vehicles and pedestrians. The cognitive map can include locations of the objects including at least one of other vehicles and pedestrians, relative to the vehicle. The image can be a monocular video frame. The cognitive map of the vehicle environment can be based on processing the image with a convolutional neural network. The convolutional neural network can be trained based on ground truth data prior to determining the cognitive map. The ground truth data can be based on object detection, pixel-wise segmentation, 3D object pose, and relative distance.

Training the convolutional neural network can be based on prediction images included in the convolutional neural network. The prediction images can be based on ground truth data. The neural network learns how to transform input RGB images to estimation of cognitive maps. The estimated cognitive maps can be combined with intermediate estimations of cognitive maps to and compared against the prediction images to determine similarity. The similarity between the estimated combined cognitive maps can be determined by calculating a cost function. The cost function can be based on a weighted cross entropy function based on comparing the estimated cognitive maps and the intermediate cognitive maps with the prediction images. The prediction images can be based on LIDAR data.

Further disclosed is a computer readable medium, storing program instructions for executing some or all of the above method steps. Further disclosed is a computer programmed for executing some or all of the above method steps, including a computer apparatus, programmed to acquire an image of a vehicle environment, determine a cognitive map, which includes a top-down view of the vehicle environment, based on the image, and operate the vehicle based on the cognitive map. The vehicle environment can include a roadway and objects including other vehicles and pedestrians. The cognitive map can include locations of the objects including at least one of other vehicles and pedestrians, relative to the vehicle. The image can be a monocular video frame. The cognitive map of the vehicle environment can be based on processing the image with a convolutional neural network. The convolutional neural network can be trained based on ground truth data prior to determining the cognitive map. The ground truth data can be based on object detection, pixel-wise segmentation, 3D object pose, and relative distance.

The computer can be further programmed to train the convolutional neural network based on prediction images included in the convolutional neural network. The prediction images can be based on ground truth data. The prediction images can transform estimated results into estimated cognitive maps. The estimated cognitive maps can be combined with intermediate cognitive maps to determine similarity. The similarity between the estimated cognitive maps and the prediction images can be determined by calculating a cost function. The cost function can be based on a weighted cross entropy function based on comparing the estimated cognitive maps combined with the intermediate cognitive maps and prediction images. The prediction images can be based on LIDAR data.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below. A vehicle-to-infrastructure (V-to-I) interface 111 includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks including the Internet via cellular networks or Wi-Fi, for example. The computing device 115 also includes nonvolatile memory such as is known. Computing device 115 can log, i.e., store in a memory, information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include conventional electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
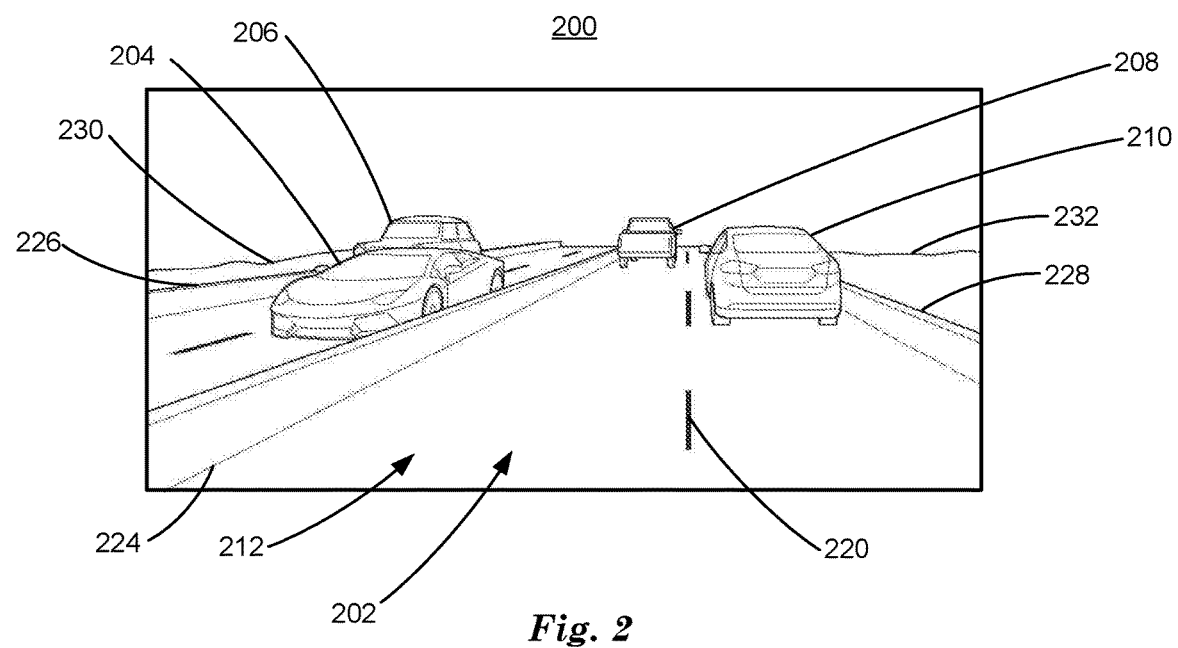
FIG. 2 is a diagram of an example image of a traffic scene.

FIG. 2 illustrates an image 200 of a traffic scene including a roadway 202 and other vehicles 204, 206, 208, 210. The image 200 can be a monocular video frame acquired by computing device 115 from a video sensor 116 included in a vehicle 110, for example. A monocular video frame can include three color planes with a bit depth of eight bits each for a total of 24 bits corresponding to red, green, and blue (RGB) color components. Image 200 can include a roadway 202, lane marker 212, barriers 224, 226, 228 and roadway shoulders or terrain adjacent to roadway 230, 232. Computing device 115 can use image 200 to produce a cognitive map including roadway 202 and objects including other vehicles 204, 206, 208, 210, lane marker 212, barriers 224, 226, 228 and roadway shoulders or terrain adjacent to roadway 230, 232 and, based on the cognitive map including roadway 202 and objects, determine predicted trajectories for operating vehicle 110.

Figure 3:
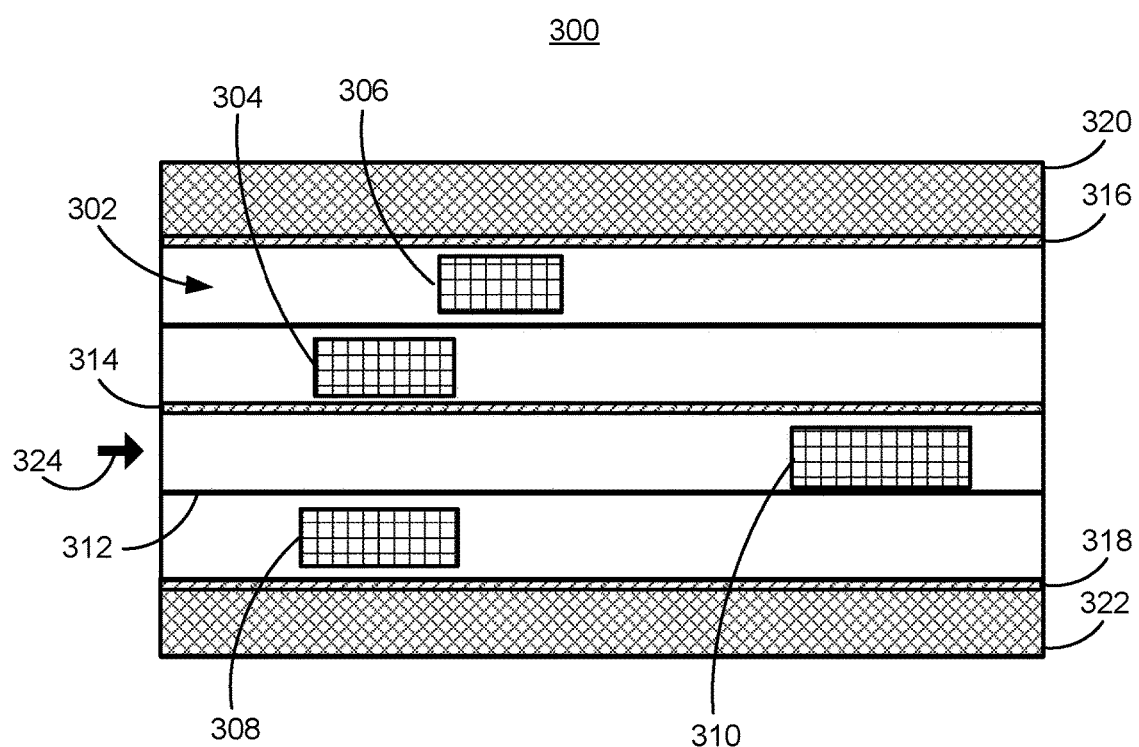
FIG. 3 is a diagram of an example cognitive map.

FIG. 3 is a cognitive map 300 of a traffic scene including a roadway 302 (white) and objects including other vehicles 304, 306, 308, 310, (grid) rendered in white and grid, respectively, to denote different colors. Likewise, lane marker 312 (black), barriers 314, 316, 318 (upward diagonal) and shoulders or adjacent terrain 320, 322 (cross-hatch) are each rendered to denote different colors, where each different color represents an object class or type and will each occupy a separate channel or plane in cognitive map 300. For example, a cognitive map can include 20 or more channels each including objects belonging to a single class, such a "roadway", "vehicle", "pedestrian", "cyclist", etc. Vehicle 110 trajectory with respect to cognitive map 300 is denoted by arrow 324. Cognitive map 300 can be created by inputting an image 200 into a convolutional neural network (CNN), configured and trained as described in relation to FIG. 4, below, which, in response to the input, outputs a cognitive map 300.

Computing device 115 can operate vehicle 110 based on cognitive map 300. Operating vehicle 110 can include actuating vehicle components such as powertrain, steering and braking via controllers 112, 113, 114 to determine vehicle location and trajectory based on predicted locations and trajectories. The predicted locations and trajectories can be determined based on the cognitive map 300. For example, computing device 115 can operate vehicle 110 to follow predicted trajectories that locate vehicle 110 in the center of a lane, the lane determined based on lane marker 312 and barrier 314 while maintaining a predetermined distance between vehicle 110 and other vehicle 310. Computing device 115 can predict vehicle trajectories that can be used to actuate powertrain, steering and braking components based on distances to and locations of objects in the cognitive map 300 relative to the location of vehicle 110, for example.

Predicted trajectories of object including other vehicles 304, 306, 308, 310 can be determined by comparing the location of the objects in successive cognitive maps 300 created at successive time intervals, from images 200 acquired at successive time intervals. Trajectories of other vehicles 304, 306, 308, 310 can be determined by determining the locations of other vehicles 304, 306, 308, 310 in successive cognitive maps 300 created at successive time intervals, fitting a curve to the location points and calculating vectors equal to the first and second derivatives of each curve in the 2D plane of the cognitive map 300. The magnitude of the first derivative is speed and the angle is direction. The second derivatives are directional derivatives parallel to the first derivative direction (longitudinal acceleration) and perpendicular to the first derivative direction (latitudinal acceleration).

Figure 4:
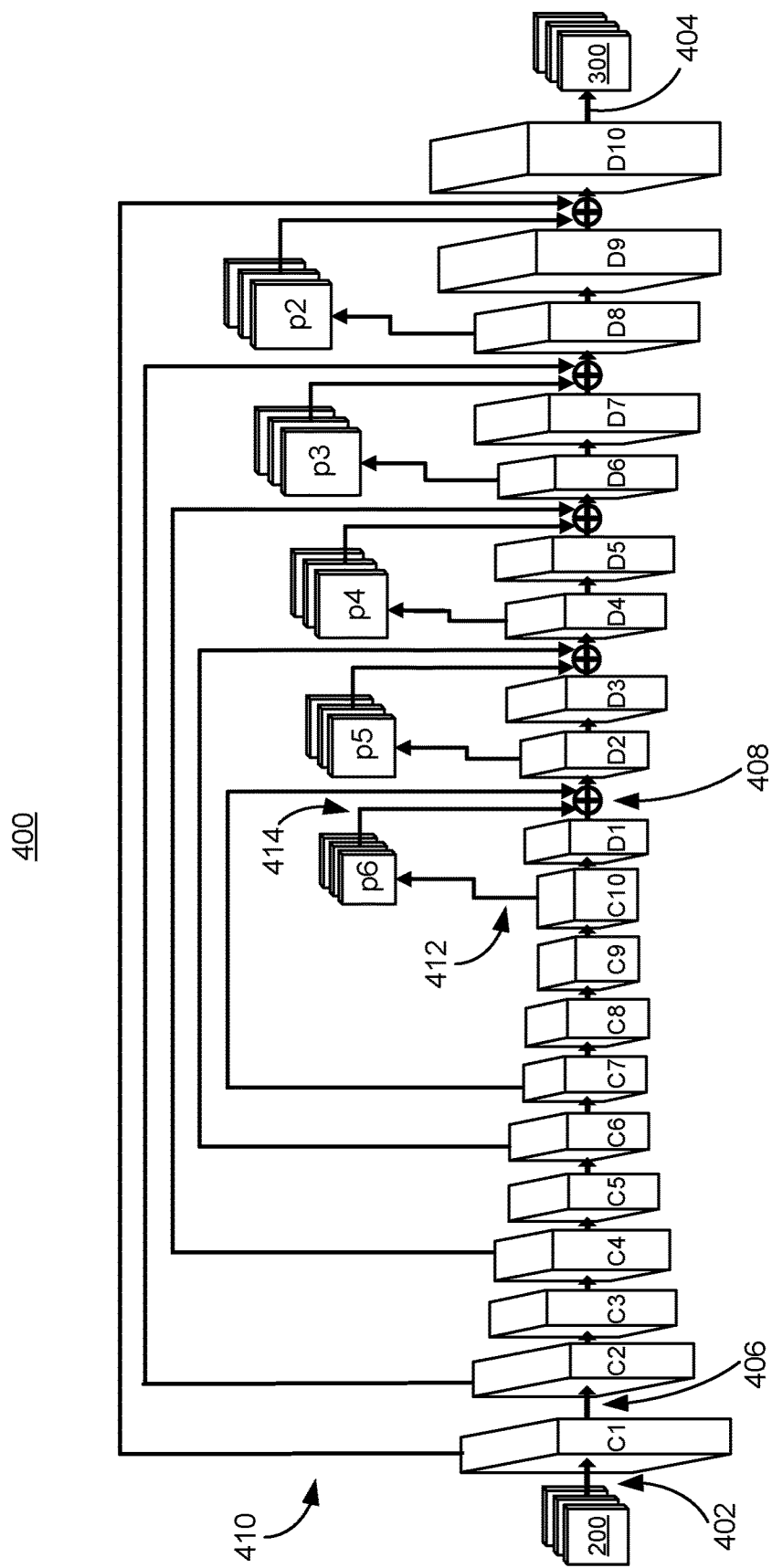
FIG. 4 is a diagram of an example convolutional neural network.

FIG. 4 is a diagram of an example CNN 400 configured to input an image 200 and output a cognitive map 300. The image 200 can be a monocular RGB video image acquired from a video sensor 116 included in a vehicle 110 that includes a scene depicting the physical environment near vehicle 110. The cognitive map 300 is a 2D representation of the physical environment near vehicle 110 including 20 or more channels each including a single class of objects present in the scene, identified by type, distance and 3D pose relative to vehicle 110, where 3D pose is defined as the orientation of an object in 3D space relative to a frame of reference expressed as angles $\rho$, $\varphi$, and $\theta$. Information regarding object type, distance and 3D pose included in cognitive map 300 as a top-down view can permit computing device 115 to determine trajectories to operate vehicle 110 safely by traveling on the roadway and avoiding collisions.

CNN 400 is a program in memory executing on a processor included in computing device 115 and includes a set of ten convolutional layers C1-C10 (3D boxes) configured to input 402 an image 200 to convolutional layer C1. Convolutional layer C1 produces an intermediate result 406, represented by the arrow between convolutional layer C1 and convolutional layer C2. Each convolutional layer C2-C10 receives an intermediate result 406 and outputs an intermediate result 406 represented by the arrows between adjacent convolutional layers C1-C10, representing forward propagation of intermediate results 406. Convolutional layers C1-C10 each output an intermediate result 406 at an output spatial resolution equal to the input spatial resolution or at an output spatial resolution reduced from the input spatial resolution. Bit depth per resolution element increases for intermediate results as spatial resolution increases as described in Table 1, below. This repeats for convolutional layers C2-C9, which produce intermediate results 406, represented by the dark arrows between convolutional layers C2-C9 at successively lower resolutions. Convolutional layers C1-C9 can reduce resolution by pooling, wherein an adjacent group of pixels, which can be a 2×2 neighborhood, for example, are combined to form a single pixel according to a predetermined equation. Combining a group of pixels by selecting a maximum value among them, called "max pooling", can reduce resolution while retaining information in intermediate results 406. Following convolutional layers C1-C10, convolutional layer C10 outputs intermediate result 406 to first deconvolutional layer D1, which can deconvolve and upsample intermediate result 406 to produce intermediate cognitive map 408, represented by the arrows between each of deconvolutional layers D1-D10. Deconvolution is convolution performed with a kernel that is, at least in part, an inverse of another kernel previously used to convolve a function and can partially invert the effects of the previous convolution. For example, deconvolutional layers D1-D10 can increase spatial resolution of intermediate cognitive map 408 while decreasing the bit depth according to Table 1, below.

Convolutional layer C10 also outputs estimated feature maps 412 to prediction image p6, which, when training CNN 400, combines estimated feature maps 412 from convolutional layer C10 with ground truth-based information regarding objects that transforms the estimated feature maps 412 into an estimated cognitive map 414. The estimated cognitive map 414 is combined with the intermediate feature maps 408 output from deconvolution layer D1 when training CNN 400. This is shown by the "+" signs on the intermediate cognitive map 408 arrow between deconvolution layers D1-D2. Comparing the intermediate cognitive map 408 based on input image I with ground truth-based information including object detection, pixel-wise segmentation, 3D object poses, and relative distances is used for training the convolutional neural network.

The "+" sign on the intermediate cognitive map 408 between deconvolution layers D1-D2 also indicates combining intermediate feature map 408 and predicted cognitive map 414 with skip connection results 410 from convolutional layer C7 received via skip connections. Skip connection results 410 are intermediate results 406 forward propagated via skip connections as input to an upsampling deconvolution layer D2, D4, D6, D8, D10. Skip connection results 410 can be combined with intermediate feature maps 408 to increase resolution of intermediate feature map 408 by upsampling to pass onto succeeding deconvolutional layers D3, D5, D7, D9. This is shown by the "+" signs on the intermediate results 408 between deconvolution layers D1-D2, D3-D4, D5-D6, D7-D8 and D9-D10. Skip connections can forward propagate skip connection results 410 at the same resolution as the deconvolutional layers D2, D4, D6, D8, D10 receiving the information.

Deconvolutional layers D1-D10 include prediction images p2-p6. Prediction images p2-p6 are used for training CNN 400 to produce cognitive maps 300 from image 200 input. Prediction images p2-p6 are determined based on ground truth images developed independently of CNN 400. Ground truth refers to information regarding the physical environment near vehicle 110. Accordingly, ground truth data in the present context can include distance and pose information determined using sensors 116 including multi-camera video sensors 116, LIDAR sensors 116, and radar sensors 116, location data from GPS sensors 116, INS sensors 116, and odometry sensors 116. Ground truth data in the present context can also include map data stored in a memory of computing device 115, and/or from a server computer 120, combined with information regarding object classification determined using CNN-based object classification programs. Such CNN-based object classification programs typically receive as input images 200, and then output images 200 segmented into regions that include objects such as roadways, lane markings, barriers, lanes, shoulders or adjacent terrain, other vehicles including type and model, and other objects including pedestrians, animals, bicycles, etc. Prediction images p2-p6 combine distance information with segmentation information to transform estimated results 412 from convolutional layer C10 and deconvolutional layers D2, D4, D6 and D8 into estimated cognitive maps 414 by orthographically projecting the estimated results 412 onto a 2D ground plane based on distance information to segmented objects and coloring the estimated cognitive map 414 based on information regarding object detection, pixel-wise segmentation, 3D object poses, and relative distances included in prediction images p2-p6.

Prediction images p2-p6 are used to train CNN 400 to output a cognitive map 300 in response to inputting an image 200 by outputting estimated cognitive maps 414, to be combined with the intermediate cognitive maps 408 output by deconvolutional layers D1, D3, D5, D7, D9. This combination is denoted by the "+" signs on the intermediate cognitive maps 408 between deconvolution layers D1-D2, D3-D4, D5-D6, D7-D8 and D9-D10. Prediction images p2-p6 can be based on ground truth including semantic segmentation applied to an input image 200. Multiple monocular images 200 acquired at different locations can be processed using optical flow techniques, for example, to determine distances to objects detected by semantic segmentation. Data from a sensor 116 can be combined with semantic segmentation information to determine distances to objects. Once distances to objects are determined and a 3D shape is estimated, a top-down view can be generated by homography, where depictions of objects detected in an input image 200 are orthographically projected onto a plane parallel with a ground plane or roadway based on their estimated 3D shape and 3D pose. Once projected onto the plane representing an estimated cognitive map 414, objects can retain their class or type, as indicated by color.

Multiple prediction images p2-p6 are used to train CNN 400 with the goal that each prediction image p2-p6 is combined with the intermediate cognitive map 408 at the appropriate resolution. Combining estimated cognitive maps 414 with intermediate cognitive maps 408 can include scoring positively (rewarding) output from deconvolutional layers D1, D3, D5, D7, D9 based on the similarity between the intermediate cognitive maps 408 and the estimated cognitive maps 414. By positively rewarding deconvolutional layers D1, D3, D5, D7, D9 in this fashion, CNN 400 can be trained to output 404 a cognitive map 300 from deconvolution layer D10. Once deconvolutional layers D1, D3, D5, D7, D9 have been trained to output intermediate cognitive maps 408, input from prediction images p2-p6 is no longer required output 404 a cognitive map 300 based on input image 200. Trained CNN 400 will output 404 a cognitive map 300 based on recognizing visual similarities between an input image 200 and input images 200 processed as part of a training set.

Similarity between the intermediate cognitive map 408 to the estimated cognitive map 414 can be determined based on a cost function that measures the similarity of the intermediate cognitive map 408 to the estimated cognitive map 414 by the equation:

$$\text{Cost}(I,M) = W * \text{Cross}_{Entropy(M,M_{Rec})} + \text{neighborhood\_cost}(M,M_{Rec}) \quad (1)$$

where W is a weight of each object calculated based on the number of available training pixels for each class of objects, I is the input image 200, M is the estimated cognitive map 414, and M_Rec is the intermediate cognitive map 408. The Cross_Entropy loss function is calculated as:

$$H(M,M\_Rec) = -\Sigma_i (M\_Rec_i * \log(M_i) + (-1 - M\_Rec_i) * \log(1 - M_i)) \quad (2)$$

where i is the $i^{th}$ pixel in the image. The neighborhood similarity cost term can be determined by considering the agreement between a pixel and its neighboring pixels in the cognitive map predictions p2-p6 and 300. Calculation of a neighborhood cost function can be simplified by applying a Gaussian filter to the cross-entropy of a 3×3 block of pixels for the estimated cognitive map and ground truth. Applying a neighborhood cost function in this manner can improve the convergence speed of training and result in better predictions.

Table 1 is a table of convolutional layers 402 C1-C10, deconvolutional layers 404 D1-D10, cognitive map 300 (p1) and prediction images p2-p6, with their respective sizes expressed as fractions of the height and width of the input RGB image 200 I, along with a bit depth, wherein the input RGB image is size W×H×3, with each of the RGB color planes having a bit depth of eight bits, with W=1920, H=1080 and bit depth of 24, for example.

TABLE 1

Sizes and bit depth for convolutional layers C1-C10, deconvolutional layers D1-D10, cognitive map 300 (p1) and prediction images p2-p6.

|   | C1-C10 | D1-D10 | p1-p6 |
|---|---|---|---|
| 1 | W/2 × H/2 × 64 | W/32 × H/32 × 512 | W × H × 24 |
| 2 | W/4 × H/4 × 128 | W/32 × H/32 × 512 | W/4 × H/4 × 24 |
| 3 | W/8 × H/8 × 256 | W/16 × H/16 × 256 | W/8 × H/8 × 24 |
| 4 | W/8 × H/8 × 256 | W/16 × H/16 × 256 | W/16 × H/16 × 24 |
| 5 | W/16 × H/16 × 512 | W/8 × H/8 × 128 | W/32 × H/32 × 24 |
| 6 | W/16 × H/16 × 512 | W/8 × H/8 × 128 | W/64 × H/64 × 24 |
| 7 | W/32 × H/32 × 512 | W/4 × H/4 × 64 | |
| 8 | W/32 × H/32 × 512 | W/4 × H/4 × 64 | |
| 9 | W/64 × H/64 × 1024 | W/2 × H/2 × 32 | |
| 10 | W/64 × H/64 × 1024 | W/2 × H/2 × 32 | |

Once trained using ground-truth based prediction images p2-p6, a CNN 400 can process input images 200 to produce cognitive maps 300 without inputting prediction images p2-p6. Convolutional layers C1-C10 can convolve and down-sample intermediate results 406 that get passed to deconvolutional layers D1-D10 to deconvolve and upsample intermediate cognitive maps 408 with input from convolutional layers C1, C2, C4, C6, C7 via skip connection results 410. Cognitive maps 300 produced by CNN 400 can be used by computing device 115 to operate vehicle 110 by permitting computing device to predict vehicle trajectories based on the cognitive map 300.

In other examples, multiple CNNs 400 can be trained to determine cognitive maps 300 based on ground truth including multiple monocular image inputs, LIDAR and radar and the results combined by adding a fusion layer to the CNNs 400. Temporal information can be included in the CNN 400 by adding recurrent convolutional layers to process temporal information. Cognitive maps 300 output from CNN 400 can be combined with other information available to computing device 115 from sensors 116 including GPS, INS and odometry location information, LIDAR, radar, and multi-camera information regarding distances and map information stored at computing device 115 or downloaded from a server computer 120, for example to improve the accuracy cognitive map 300 p1 and distances to objects therein.

In other examples, in cases where other information available to computing device 115 including GPS, INS and odometry location information, LIDAR, radar, and multi-camera information regarding distances and map information stored at computing device 115 or downloaded from a server computer 120, provides information that does not agree with the cognitive map 300 p1, a recorded image 200 along with recorded ground truth information can be used to update CNN 400 by providing additional training. The re-trained CNN 400 can be stored in computing device 115 memory for future use. A trained CNN 400 can be recalled from memory and executed by computing device 115 to produce cognitive maps 300 from image 200 input in real time as required for operation of a vehicle 110 on a roadway with traffic, for example.

Figure 5:
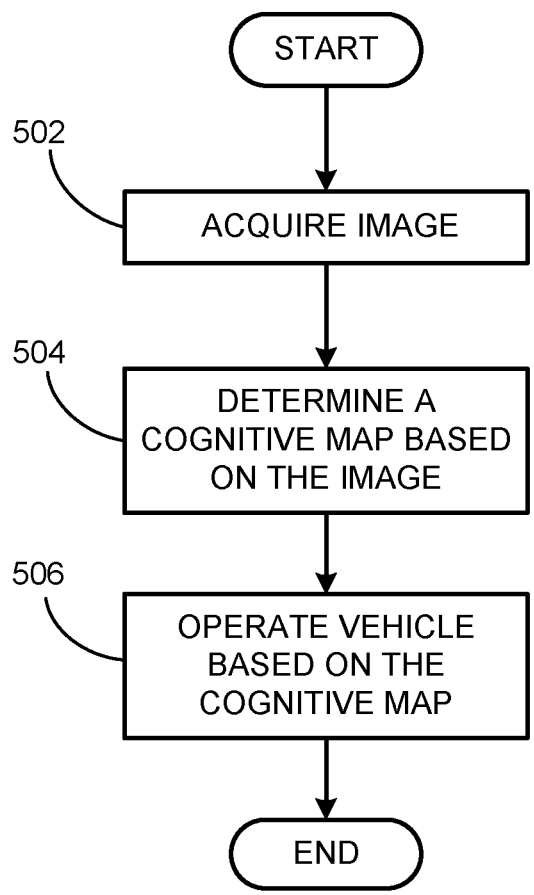
FIG. 5 is a flowchart diagram of an example process to operate a vehicle based on a cognitive map.

FIG. 5 is a diagram of a flowchart, described in relation to FIGS. 1-4, of a process 500 for operating a vehicle based on a cognitive map. Process 500 can be implemented by a processor of computing device 115, taking as input information from sensors 116, and executing commands and sending control signals via controllers 112, 113, 114, for example. Process 500 includes multiple steps taken in the disclosed order. Process 500 also includes implementations including fewer steps or can include the steps taken in different orders.

Process 500 begins at step 502, where a computing device 115 included in a vehicle 110 acquires an image 200 as described above in relation to FIG. 2. The image 200 can be an RGB color video image acquired by a video sensor 116 included in vehicle 110. The image 200 can depict the physical environment near vehicle 110, including a roadway 202 and objects including other vehicles 204, 206, 208, 210.

At step 504 computing device 115 inputs image 200 to a trained CNN 400 as discussed above in relation to FIG. 4, above. In response to inputting image 200, trained CNN 400 produces a cognitive map 300 including a roadway 302 and objects including other vehicles 304, 306, 308, 310. Training CNN 400 will be discussed in relation to FIG. 6.

At step 506 computing device 115 operates a vehicle 110 based on cognitive map 300. Computing device 115 can operate vehicle 110 based on cognitive map 300 by determining predicted vehicle trajectories based on lanes and objects including other vehicles. Computing device 115 can combine cognitive maps 300 with map data from multi-camera sensors 116, LIDAR sensors 116, and radar sensors 116, location data from GPS, INS and odometry and map data from a server computer 120, for example, to improve the accuracy of cognitive map 300. Thus, based on the cognitive map 300, the computing device 115 can provide instructions to one or more of the powertrain controller 112, brake controller 113, and steering controller 114. For example, the computing device may be programmed to take certain actions concerning adjusting or maintains speed, acceleration, and/or steering based on objects such as other vehicles 304-310; the cognitive map 300 advantageously can provide more accurate data for such actions than was previously available. Vehicle 110 safety and or efficiency can thereby be improved by the cognitive map 300. Following this step process 500 ends.

Figure 6:
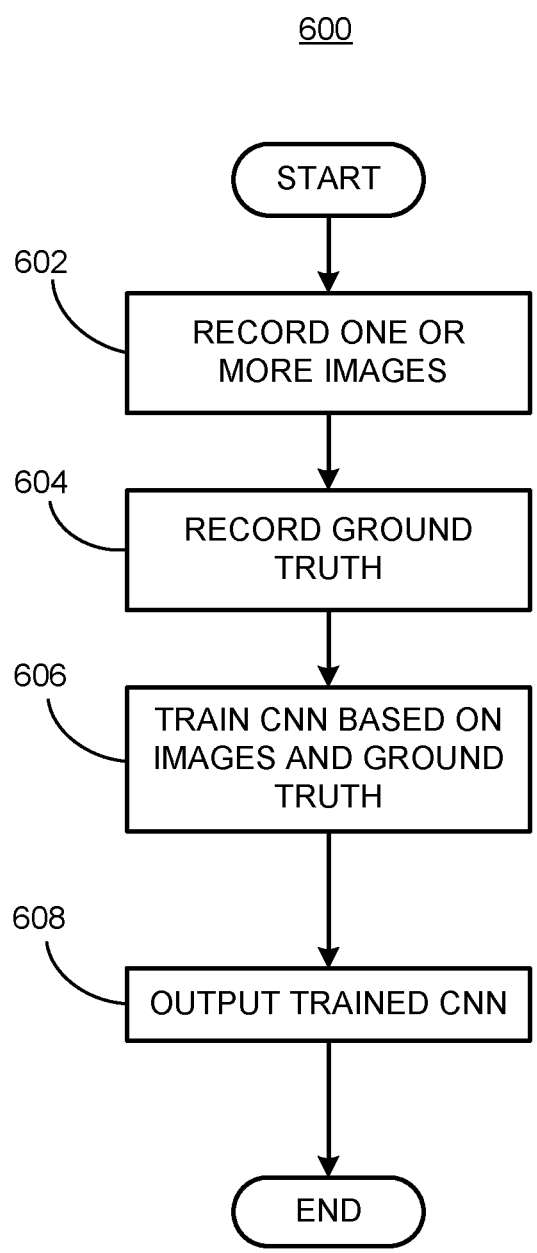
FIG. 6 is a flowchart diagram of an example process to train a convolutional neural network to output a cognitive map.

FIG. 6 is a diagram of a flowchart, described in relation to FIGS. 1-4, of a process 600 for training a CNN 400 based on ground-truth. Process 600 can be implemented by a processor of computing device 115, taking as input information from sensors 116, and executing commands and sending control signals via controllers 112, 113, 114, for example. Process 600 includes multiple steps taken in the disclosed order. Process 600 also includes implementations including fewer steps or can include the steps taken in different orders.

Process 600 begins at step 602, where a computing device 115 included in a vehicle 110 acquires and records one or more images 200 as described above in relation to FIG. 2. The images 200 can be an RGB color video images acquired by a video sensor 116 included in vehicle 110. The image 200 can depict the physical environment near vehicle 110, including a roadway 202 and objects including other vehicles 204, 206, 208, 210.

At step 604 computing device 115 records ground truth data based on object detection, pixel-wise segmentation, 3D object poses, and relative distances all determined based on recorded images 200, distance data, location data, and map data as discussed above in relation to FIG. 4, corresponding to the images 200 recorded at step 602.

At step 606 computing device inputs images 200 to CNN 400 while constructing prediction images p2-p6 to train CNN 400 according to cost functions in equations 1 and 2, above. Prediction images p2-p6 are constructed to include the recorded ground truth data based on object detection, pixel-wise segmentation, 3D object poses, and relative distances. Prediction images p2-p6 can be created by homographic projection of ground truth data and used to transform estimated results 412 into top-down view, estimated cognitive maps 414 that can be used to train CNN 400 to output a cognitive map 300 in response to inputting an image 200 as discussed above in relation to FIG. 4. By comparing the intermediate cognitive maps 806 output by deconvolution layers D1, D3, D5, D7, and D9 with the estimated cognitive results 414 and back propagating the results of a cost function as described in relation to equations 1 and 2, CNN 400 can be trained to output a cognitive map 300 in response to an input image 200.

At step 608 the trained CNN 400 is output to be stored at memory included in computing device 115. Computing device 115 can recall the trained CNN 400 from memory, input an acquired image 200 to the trained CNN 400 and receive as output a cognitive map 300, to be used to operate a vehicle 110, without having to input ground truth data. Following this step process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:
1. A method, comprising:
acquiring, from an image sensor, an image of a vehicle environment;
determining, by executing programming in a processor, a cognitive map as output from a convolutional neural network (CNN) that accepts the image as input, the cognitive map including a plurality of objects, including a class, location, and pose of each object in a top-down view of the vehicle environment, wherein the cognitive map includes a plurality of planes, each of the planes including at most a single class of object; and operating the vehicle based on the cognitive map.

2. The method of claim 1, wherein the vehicle environment includes a roadway, and the objects include other vehicles and pedestrians.

3. The method of claim 2, further comprising determining the cognitive map including locations of the objects including at least one of other vehicles and pedestrians, relative to the vehicle.

4. The method of claim 1, wherein the image is a monocular video frame.

5. The method of claim 1, further comprising training the convolutional neural network based on ground truth data prior to determining the cognitive map.

6. The method of claim 5, wherein ground truth data is based on object detection, pixel-wise segmentation, 3D object pose, and relative distance.

7. The method of claim 6, wherein training the convolutional neural network is based on prediction images included in the convolutional neural network.

8. The method of claim 7, wherein the prediction images are based on ground truth data.

9. A system, comprising a processor; and a memory, the memory including instructions to be executed by the processor to:
  acquire an image of a vehicle environment;
  determine a cognitive map as output from a convolutional neural network (CNN) that accepts the image as input, the cognitive map including a plurality of objects, including a class, location, and pose of each object in a top-down view of the vehicle environment, wherein the cognitive map includes a plurality of planes, each of the planes including at most a single class of object; and
  operate the vehicle based on the cognitive map.

10. The processor of claim 9, wherein the vehicle environment includes a roadway, and the objects include other vehicles and pedestrians.

11. The processor of claim 10, the instructions further including instructions to determine the cognitive map including locations of the objects including at least one of other vehicles and pedestrians, relative to the vehicle.

12. The processor of claim 9, wherein the image is a monocular video frame.

13. The processor of claim 9, wherein the convolutional neural network is trained based on ground truth data prior to determining the cognitive map.

14. The processor of claim 13, wherein ground truth data includes object detection, pixel-wise segmentation, 3D object pose, and relative distance.

15. The processor of claim 14, wherein training the convolutional neural network is based on prediction images included in the convolutional neural network.

16. The processor of claim 15, wherein the prediction images are based on ground truth data.

17. A system, comprising:
  a video sensor operative to acquire an image of a vehicle environment;
  vehicle components operative to operate a vehicle;
  a processor; and a memory, the memory including instructions to be executed by the processor to:
    acquire the image of the vehicle environment;
    determine a cognitive map as output from a convolutional neural network (CNN) that accepts the image as input, the cognitive map including a plurality of objects, including a class, location, and pose of each object in a top-down view of the vehicle environment, wherein the cognitive map includes a plurality of planes, each of the planes including at most a single class of object; and
  operate the vehicle based on the cognitive map.

18. The system of claim 17, wherein the vehicle environment includes a roadway, and the objects include other vehicles and pedestrians.

* * * * *